No. 697,073.  
E. M. DAVIS.  
BICYCLE GEAR.  
(Application filed June 10, 1901.)  
Patented Apr. 8, 1902.

(No Model.)

Witnesses.  
Harold M. Stringer  
G. J. Mead

Inventor.  
Eugene M. Davis.  
By Geo. S. Stringer  
Atty.

UNITED STATES PATENT OFFICE.

EUGENE M. DAVIS, OF DUNKIRK, NEW YORK.

BICYCLE-GEAR.

SPECIFICATION forming part of Letters Patent No. 697,073, dated April 8, 1902.

Application filed June 10, 1901. Serial No. 63,924. (No model.)

*To all whom it may concern:*

Be it known that I, EUGENE M. DAVIS, a citizen of the United States, residing at Dunkirk, in the county of Chautauqua and State of New York, have invented certain new and useful Improvements in Bicycle-Gear; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in bicycle-gear; and it consists in the mechanism hereinafter set forth and described, and illustrated in the accompanying drawings, in which—

Figure 1:
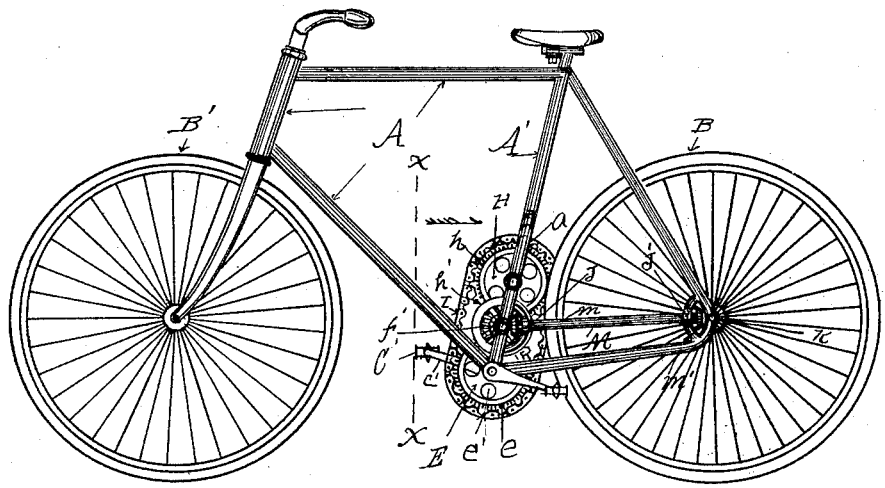
Figure 2:
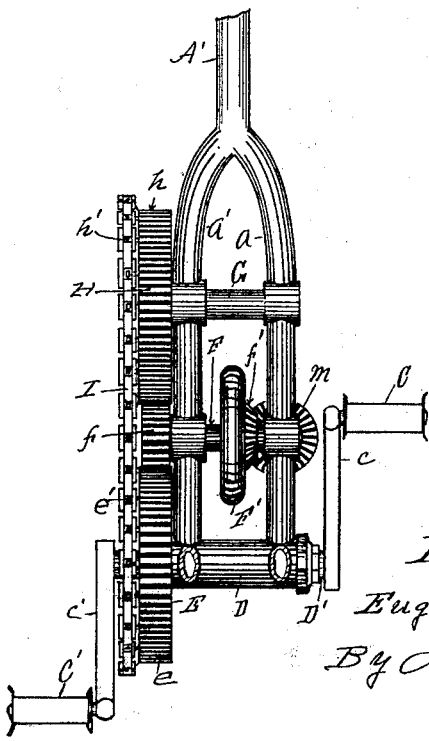

Figure 1 is a side view in elevation of a bicycle embodying my invention. Fig. 2 is a view in elevation of a section of the same looking from the line $x\,x$ in Fig. 1.

In the drawings thus illustrating my invention, A represents a bicycle-frame, and B and B' the wheels of a bicycle. The lower part of the seat-post A' of the frame A is preferably made of a fork $a\,a'$, which is joined to a crank-shaft hanger D. In this hanger I mount a crank-shaft D' in the usual manner, provided with the usual cranks $c\,c'$, having pedals C C' thereon. On the shaft D', I secure a wheel E, provided with an external gear-rim $e$, and a sprocket-wheel $e'$ thereon. In the fork $a\,a'$ I mount a shaft F, provided with a pinion $f$, intermeshing with the teeth of the gear-rim $e$ on the wheel E and with a balance-wheel F' and a bevel gear-wheel $f'$ thereon. In the fork $a\,a'$, above the shaft F, I also mount a shaft G. On this shaft G, I mount a wheel H, provided with an external gear-rim $h$, of equal size with the gear-rim $e$, and a sprocket-wheel $h'$, of equal size with the sprocket-wheel $e'$. The gear-rim $h$ intermeshes with the pinion $f$, and a sprocket-chain connects the sprocket-wheels $e'$ and $h'$, so that the wheels E and H rotate in unison and the gear-wheels $e$ and $h$ thereon intermeshing with opposite sides of the pinion $f$ operate to equalize the power exerted by the gears thereon.

On the rear side of the arm $a$ of the fork $a\,a'$ there is a bearing J. On the frame A, adjacent to the hub $b$ of the wheel B, there is another bearing J'. In these bearings I mount a shaft M, provided at one end with a bevel-pinion $m$, which intermeshes with and is driven by the bevel-pinion $f'$, and on the opposite end of the shaft M there is a bevel-pinion $m'$, which intermeshes with a bevel-pinion K on the hub $b$ of the rear wheel B, so that the power of the gear-rims $e$ and $h$ is transmitted through the shaft F, bevel-gears $f'$ and $m$, shaft M, and bevel-gears $m'$ and K to the hub $b$ of the rear wheel B, so as to drive the bicycle. By means of this construction I so apply the power of the cranks $c\,c'$ to the pinion $f$ that the strain thereon is balanced in all directions, and the balance-wheel F' operates to maintain the momentum thereof, so as to equalize the speed.

Having thus described my invention so as to enable others to construct and operate the same, what I claim as new, and desire to secure by Letters Patent of the United States, is—

1. In a velocipede, the combination, with two driving-shafts arranged parallel with each other, of connecting mechanism constraining the said shafts to revolve simultaneously, means for revolving the said shafts, similar toothed driving-wheels secured on the said shafts, an intermediate shaft arranged between the two said driving-shafts, a toothed pinion secured on the intermediate driving-shaft and gearing into the said wheels, and means for connecting the said intermediate shaft with one of the road-wheels, substantially as set forth.

2. In a velocipede, the combination, with a frame provided with a forked portion, and two parallel driving-shafts journaled therein, one of the said driving-shafts being provided with cranks and treadles; of sprocket-wheels and toothed wheels secured on the said shafts outside the said forked portion, a drive-chain connecting the said sprocket-wheels, an intermediate shaft journaled in the frame between the two said shafts, a toothed pinion secured on the said intermediate shaft and gearing into the said toothed wheels, a balance-wheel secured on the intermediate shaft in the said forked portion, and means for connecting the said intermediate shaft with one of the road-wheels, substantially as set forth.

3. The combination in a bicycle driving-gear, of a frame, a crank-shaft mounted therein, a gear and a sprocket-wheel mounted on said crank-shaft, a pinion-shaft, a pinion meshing with the crank-shaft gear, another shaft mounted in the frame, a gear and a sprocket-wheel mounted thereon said gear intermeshing with the gear on the pinion-shaft, a chain connecting said sprocket-wheels and driving them in unison, a balance-wheel and a bevel-gear on said pinion-shaft, a bevel-gear on the rear-wheel hub, and a shaft and bevel-gears thereon connecting the bevel-gear on the pinion-shaft and the bevel-gear on the wheel-hub, substantially as and for the purpose set forth.

In testimony whereof I affix my signature in presence of two witnesses.

EUGENE M. DAVIS.

Witnesses:
HAROLD M. STURGEON,
F. J. BASSETT.